US012496947B2

(12) United States Patent
Ventre et al.

(10) Patent No.: US 12,496,947 B2
(45) Date of Patent: Dec. 16, 2025

(54) SEAT BASE OF A VEHICLE SEAT, SEAT AND ASSOCIATED METHOD OF MANUFACTURE

(71) Applicant: Faurecia Sièges d'Automobile, Nanterre (FR)

(72) Inventors: David Ventre, Velizy Villacoublay (FR); Samuel Ploye, Pussay (FR)

(73) Assignee: Faurecia Sièges d'Automobile, Nanterre (FR)

( * ) Notice: Subject to any disclaimer, the term of this patent is extended or adjusted under 35 U.S.C. 154(b) by 284 days.

(21) Appl. No.: 18/114,983

(22) Filed: Feb. 27, 2023

(65) Prior Publication Data

US 2023/0271538 A1    Aug. 31, 2023

(30) Foreign Application Priority Data

Feb. 28, 2022    (FR) ................................. FR 22 01754

(51) Int. Cl.
| | |
|---|---|
| *B60N 2/60* | (2006.01) |
| *B60N 2/62* | (2006.01) |
| *B60N 2/68* | (2006.01) |
| B60N 2/02 | (2006.01) |
| B60N 2/18 | (2006.01) |
| B60N 2/90 | (2018.01) |

(52) U.S. Cl.
CPC ............. *B60N 2/62* (2013.01); *B60N 2/682* (2013.01); *B60N 2/0284* (2013.01); *B60N 2/1803* (2013.01); *B60N 2/995* (2018.02)

(58) Field of Classification Search
CPC ........ B60N 2/995; B60N 2/1803; B60N 2/18; B60N 2/0284; B60N 2/62; B60N 2/682
See application file for complete search history.

(56) References Cited

U.S. PATENT DOCUMENTS

| 4,648,735 A * | 3/1987 | Oddenino | ............... F16B 7/048 |
| | | | 403/187 |
| 9,694,716 B2 * | 7/2017 | Masuda | ................. B60N 2/565 |
| 9,987,950 B2 * | 6/2018 | Yadav | ..................... B60N 2/682 |
| 10,202,052 B2 * | 2/2019 | Nakamura | ............. B60N 2/682 |

(Continued)

FOREIGN PATENT DOCUMENTS

DE    102007058331 A1 *    6/2009    ........... B60N 2/1821

OTHER PUBLICATIONS

French search report for French application No. FR 2201754, dated Sep. 23, 2022, 2 pages.

*Primary Examiner* — Syed A Islam
(74) *Attorney, Agent, or Firm* — Reising Ethington P.C.

(57) ABSTRACT

A seat base for a vehicle seat includes: two seat base side flanges; a seat base front flange rotatably mounted with respect to the two seat base side flanges; and a mechanism for adjusting the orientation of the front flange relative to the side flanges. The mechanism includes: two connecting rods, each connecting rod being connected to one of the side flanges; a tube extending between the two connecting rods; and at least one clip attached to the front flange and having a baseplate and two branches extending from the baseplate to form a receiving space wherein a portion of the tube is received; each clip further having at least one tie arranged between the baseplate and one of the branches. The baseplate, the two branches, and each tie are integral with each other.

11 Claims, 4 Drawing Sheets

(56) References Cited

U.S. PATENT DOCUMENTS

| | | | |
|---|---|---|---|
| 10,239,431 B2 * | 3/2019 | Line | B60N 2/62 |
| 10,322,654 B2 * | 6/2019 | Fukuda | B60N 2/68 |
| 10,391,910 B2 * | 8/2019 | Line | B60N 2/7094 |
| 10,471,863 B2 * | 11/2019 | Tsuzaki | B60N 2/68 |
| 11,084,405 B2 * | 8/2021 | Onuma | B60N 2/682 |
| 11,135,954 B1 * | 10/2021 | Gajda | B60N 2/686 |
| 12,233,766 B2 * | 2/2025 | Asakura | B60N 2/1615 |
| 2021/0291708 A1 | 9/2021 | Gajda et al. | |

* cited by examiner

SEAT BASE OF A VEHICLE SEAT, SEAT AND ASSOCIATED METHOD OF MANUFACTURE

TECHNICAL FIELD

The present invention relates to a seat base of a vehicle seat.

The invention also relates to such a vehicle seat.

The invention also relates to a method for manufacturing a clip of such a seat base.

BACKGROUND

The vehicle is in particular a motor vehicle. However, the invention is also similarly applicable to an air, rail, or maritime vehicle.

The seat is arranged in the passenger compartment of the vehicle. The position of the seat in the passenger compartment may be adjustable. It is in fact known to adjust the elevation and/or the forward movement of the seat, in particular to offer the driver a more comfortable ride.

It is also known to adjust the inclination of the seat base with respect to the horizontal, in particular in order to allow the driver to adjust the seat to the length of his legs in order to easily and comfortably access the pedals. Thus, it has been proposed to install in the seat base a mechanism for adjusting the inclination of the seat, actuated in an either manual or motorized manner.

However, in the event of a rear crash, tests have shown that such mechanisms could break depending on the mechanism design and the forcefulness and other parameters of the crash and, in doing so, lead to loose parts being ejected into the vehicle.

SUMMARY

One of the objects of the invention is therefore to propose a seat base with adjustable inclination that does not lead to the ejection of parts in the passenger compartment of the vehicle during a rear crash.

To this end, embodiments of the invention relate to a seat base for a vehicle seat, in particular a motor vehicle, comprising:
  two seat base side flanges;
  a seat base front flange mounted to rotate in relation to the two seat base side flanges; and
  a mechanism for adjusting the orientation of the front flange relative to the side flanges, the adjustment mechanism comprising:
    two connecting rods, each connecting rod being connected to one of the side flanges;
    a tube extending between the two connecting rods; and
    at least one clip fastened to the front flange, each clip comprising a baseplate and two branches extending from the baseplate to form a receiving space in which a part of the tube is received, each clip further comprising at least one tie arranged between the baseplate and one of the branches, the baseplate, the two branches, and each tie being integral.

Such a seat base makes it possible to adjust the orientation of the front flange with respect to the side flanges, and therefore to adjust the inclination of the seat base for the occupant of the seat. The clip receiving the tube is a part of the mechanism impacted by forces during a rear crash. In fact, in the event of a rear crash, the occupant of the seat exerts a significant force on the seat back and the movement of the legs also exerts an upwards twisting force on the seat base. These forces are transmitted into the adjustment mechanism and may possibly lead to the breakage of such a clip. However, the tie arranged between the baseplate and one of the branches makes it possible to retain a part which would have broken during the crash and makes it possible to avoid a separation of the clip. Thus, the tie can help avoid the projection of the broken part into the passenger compartment of the vehicle.

Moreover, such a clip can be inexpensive and easy to manufacture and thus easily integrated into any vehicle in an economical manner.

According to other advantageous aspects of the invention, the seat base comprises one or more of the following features, taken alone or in all technically feasible combinations:
  each clip comprises two ties arranged on either side of the baseplate;
  the two branches comprise an upper branch connected to the front flange and a lower branch extending opposite the upper branch, each tie being arranged between the baseplate and the lower branch;
  each tie comprises: a first projection outside the baseplate; a first segment extending from the first projection in a direction orthogonal to the lower branch; a second projection out of the lower branch, and a second segment extending from the first segment substantially in the same direction as the lower branch to the second projection;
  each clip comprises a fastening element projecting out of the upper branch, the fastening element being a quarter-turn fastener cooperating with an opening arranged in the front flange;
  each clip is formed of polyoxymethylene in copolymer form;
  each clip comprises an inner surface defining the space for receiving the tube, the inner surface having a rounded shape at the connection between the baseplate and each branch; and
  each clip comprises a tongue projecting from the baseplate into the receiving space, the tube being received between the tongue and one of the branches.

The invention also relates to a vehicle seat, in particular of a motor vehicle, comprising a seat base as described above.

The invention also relates to a motor vehicle comprising at least one seat as described above.

The invention also relates to a method for manufacturing a clip of a seat base as defined above, the method comprising at least the following steps:
  providing a single mold,
  injecting a copolymer into the mold in order to form the clip.

BRIEF DESCRIPTION OF THE DRAWINGS

Other aspects and advantages of the invention will appear on reading the following description, given by way of example and made with reference to the appended drawings, wherein.

DETAILED DESCRIPTION

Figure 1:
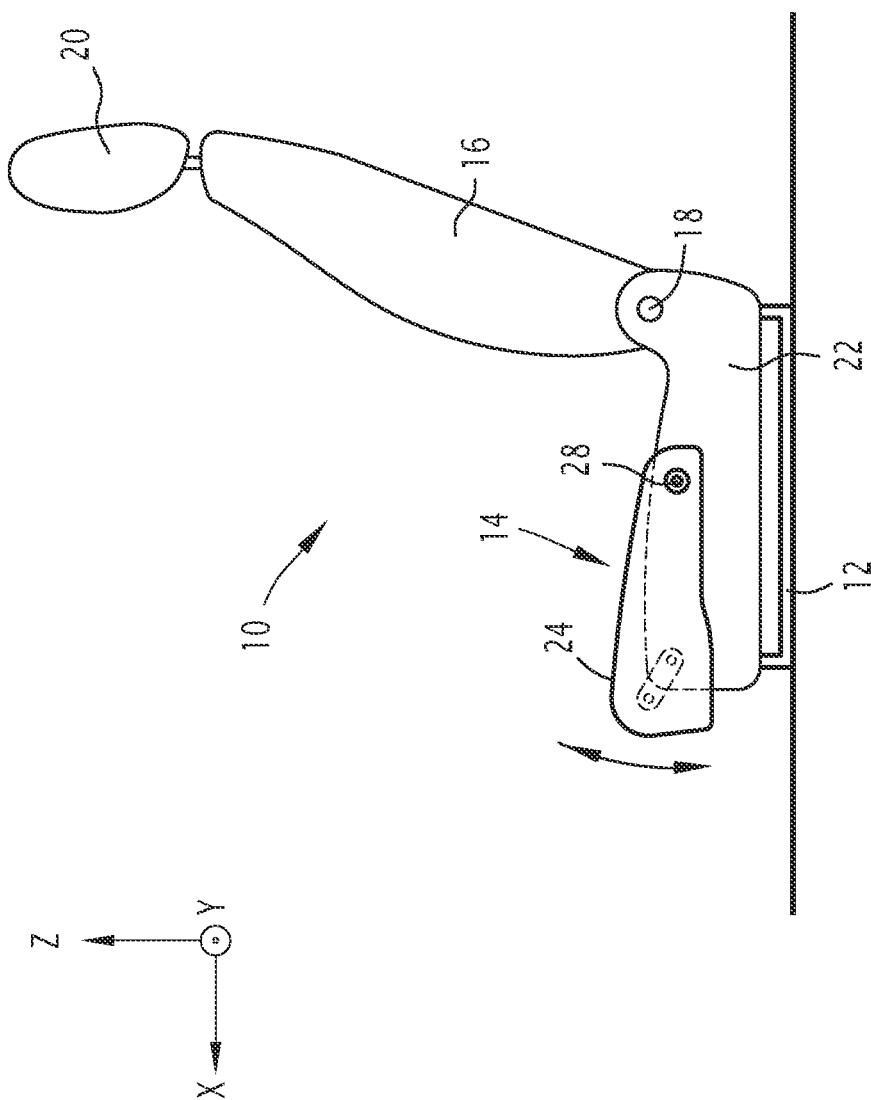
FIG. 1 is a schematic side view of a seat comprising a seat base according to an embodiment of the invention.

A seat 10 according to an embodiment of the invention is shown schematically in FIG. 1.

The seat 10 is suitable to be placed in the passenger compartment of a motor vehicle and to receive an occupant.

As a variant, the seat 10 is placed in an air, rail, or maritime vehicle.

The seat 10 defines a longitudinal direction X identical to the longitudinal direction of the vehicle in which the seat 10 is mounted. This longitudinal direction X corresponds to the normal direction of travel of the vehicle and the length of the vehicle.

The seat 10 also defines a transverse direction Y corresponding to a direction perpendicular to the normal direction of travel of the vehicle and the width of the vehicle.

The seat 10 also defines an elevation direction Z, perpendicular to the longitudinal X and transverse Y directions and corresponding to the height of the vehicle.

Hereinafter, the terms "horizontal" and "vertical" are used with respect to these longitudinal X, transverse Y, and elevation Z directions.

The seat 10 is for example mounted on a slide mechanism 12 making it possible to adjust the position of the seat 10 in the longitudinal direction X-X'.

As shown in FIG. 1, the seat 10 comprises a seat base 14 on which a seat back 16 is mounted, generally pivoting about an axis 18, and a headrest 20.

The seat base 14 extends substantially in the longitudinal direction X from the seat back 16. The seat base 14 advantageously comprises a trim element, not shown here, consisting for example of fabric or leather forming a support surface on which the occupant may sit.

In particular, as shown in FIG. 1, the seat base 14 comprises two seat base side flanges 22, a seat base front flange 24, and an adjustment mechanism 26.

Figure 2:
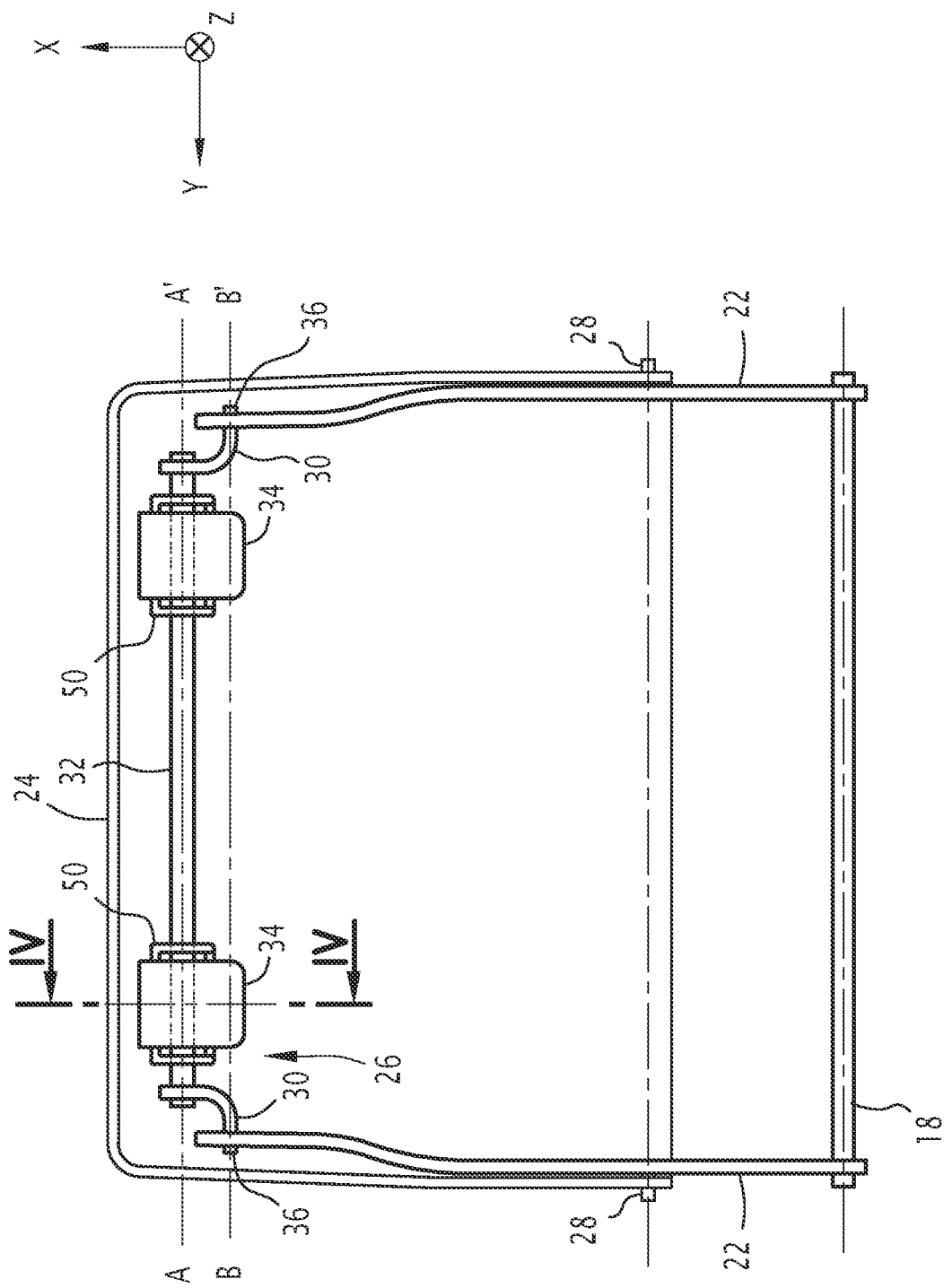
FIG. 2 is a bottom view of the seat base of FIG. 1.

The two side flanges 22 extend in a vertical plane, shown in FIG. 2, in the longitudinal direction X.

In particular, as may be seen in FIG. 2, the two side flanges 22 extend on either side of the seat back 16 with respect to the transverse direction Y.

Each side flange 22 is notably formed of a metallic material in order to ensure good mechanical strength.

The front flange 24 is rotatably mounted relative to the two side flanges 22. In particular, the front flange 24 is fastened to each side flange via a rotating fastening point 28. The front flange 24 is capable of pivoting about these fastening points 28, as illustrated by the double arrow in FIG. 1.

The front flange 24 is in particular formed of a metallic material to ensure good mechanical strength.

The adjustment mechanism 26 is suitable for adjusting the orientation of the front flange 24 with respect to the side flanges 22.

The adjustment mechanism 26 is in particular connected to a manual actuator, such as a handle, and/or a motor configured to supply the adjustment mechanism 26 with the power to adjust the orientation.

As visible in FIG. 2, the adjustment mechanism 26 comprises two connecting rods 30, a tube 32, and at least one clip 34.

Each connecting rod 30 is connected to a respective side flange 22. In particular, each connecting rod 30 is fastened to the respective end of the side flange 22 opposite the seat back 16 in the longitudinal direction X.

The tube 32 extends between the two connecting rods 30, along an axis A-A' parallel to the transverse direction Y.

The tube 32 extends in particular over a length greater than half the width of the seat base 14 in the transverse direction Y.

The tube 32 is notably made of metal.

The tube 32 has notably a polygonal shape, for example square, or circular.

The connecting rods 30 make it possible to hinge the tube 32 with respect to the two side flanges 22. In particular, the connecting rods 30 allow a rotary movement of the tube 32 about a transverse axis B-B' passing through the fastenings 36 of the connecting rods 30 with the side flanges 22.

Each clip 34 is fastened to the front flange 24.

Advantageously, as shown in FIG. 2, the adjustment mechanism 26 comprises two clips 34. The two clips 34 are arranged symmetrically with respect to a longitudinal vertical plane.

Figure 3:
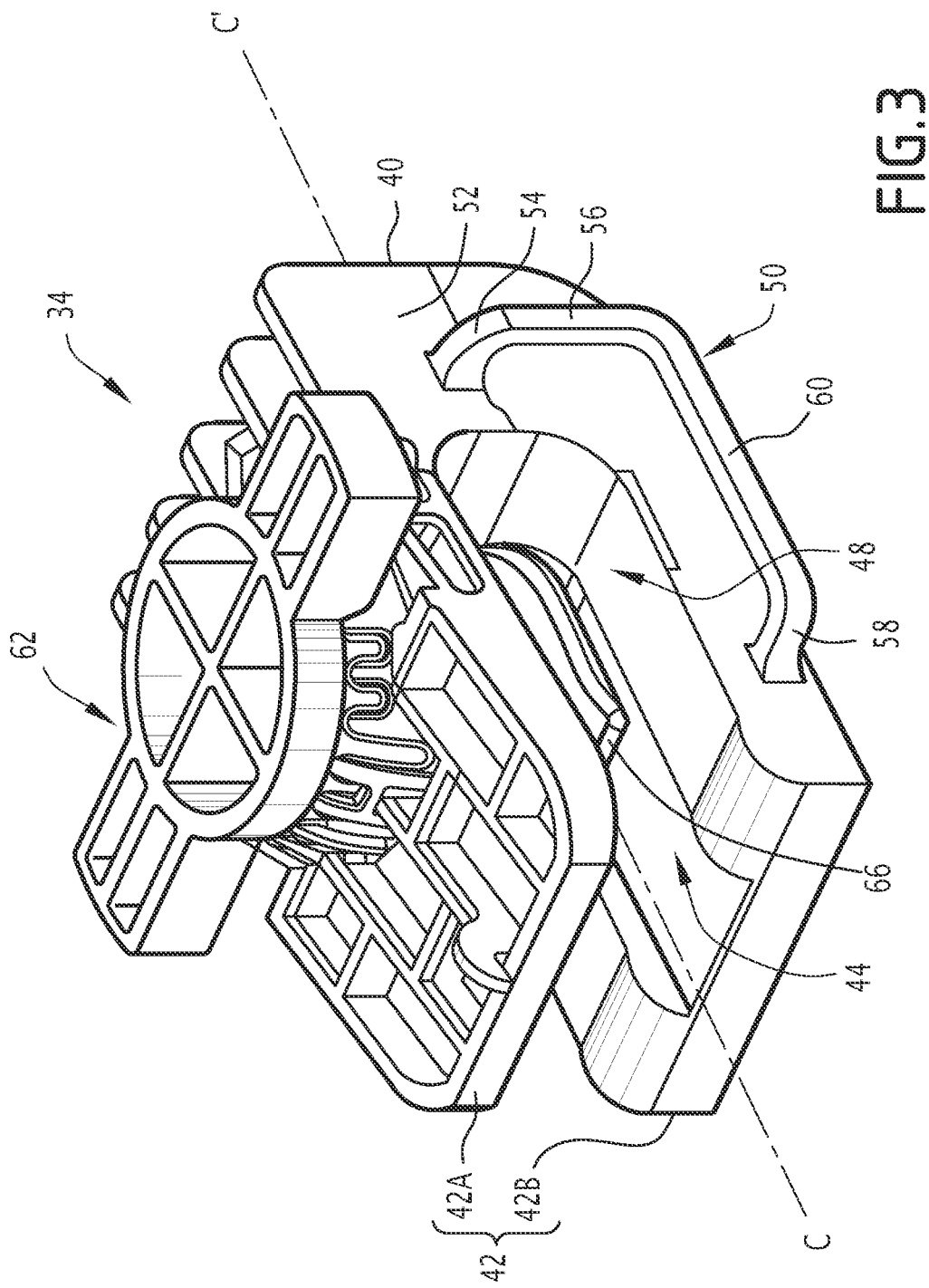
FIG. 3 is a perspective view of a clip of the seat base of FIG. 2.

Referring to FIG. 3, each clip 34 comprises a baseplate 40 and two branches 42.

The two branches 42 extend from the baseplate 40 to form a receiving space 44 into which a part of the tube 32 is received.

As visible in FIGS. 2 and 3, the tube 32 is thus received in the two clips 34 and thus allows the articulation between the adjustment mechanism 26 and the front flange 24.

In particular, the two branches 42 extend substantially parallel in a main direction C-C'.

The baseplate 40 extends in a plane substantially orthogonal to the main direction C-C'.

The clip 34 comprises an inner surface 48 defining the receiving space 44 of the tube 32.

The inner surface 48 advantageously has a rounded shape at the connection between the baseplate 40 and each branch 42. This entirely curved shape makes it possible to limit the concentrations of stress and makes it possible to delay the possible rupture of the clip 34 during a rear crash.

Referring to FIG. 3, the two branches 42 comprise an upper branch 42A connected to the front flange 24 and a lower branch 42B extending opposite the upper branch 42A.

Each clip 34 has two side surfaces 52 extending on either side of the clip 34 with respect to the main direction C-C'.

The clip 34 further comprises at least one tie 50 arranged between the baseplate 40 and one of the branches 42.

Advantageously, each clip 34 comprises two ties 50 arranged on either side of the baseplate 40 with respect to the main direction C-C'.

In particular, each tie 50 is arranged between the baseplate 40 and the lower branch 42B.

Each tie 50 extends between at least one connecting surface located on the baseplate 40 and at least one connecting surface located on the lower branch 42B. Advantageously, each tie 50 extends between a single connecting surface located on the baseplate 40 and a single connecting surface located on the lower branch 42B. Thus, the tie 50 is partly separated from the associated side surface 52 and thus defines an empty space with the rest of the clip 34.

Referring to FIG. 3, each tie 50 comprises a first projection 54 outside the baseplate 40, in particular projecting orthogonally with respect to the side surface 52.

Each tie 50 further comprises a first segment 56 extending from the first projection 54 in a direction orthogonal to the lower branch 42B.

Each tie 50 further comprises a second projection 58 outside the lower branch 42B, in particular projecting orthogonally with respect to the side surface 52.

Each tie 50 further comprises a second segment 60 extending from the first segment 56 substantially in the same direction as the lower branch 42B as far as the second projection 58. In particular, the second segment 60 extends along the main direction C-C'.

Each clip 34 further comprises a fastening element 62 projecting out of the upper branch 42A.

The fastening element 62 is a quarter-turn fastener cooperating with an opening 64 arranged in the front flange 24. In particular, the fastening element 62 is suitable to be inserted into the opening 64, then the clip is turned by 90° in order to fasten the clip 34 to the front flange 24.

Figure 4:
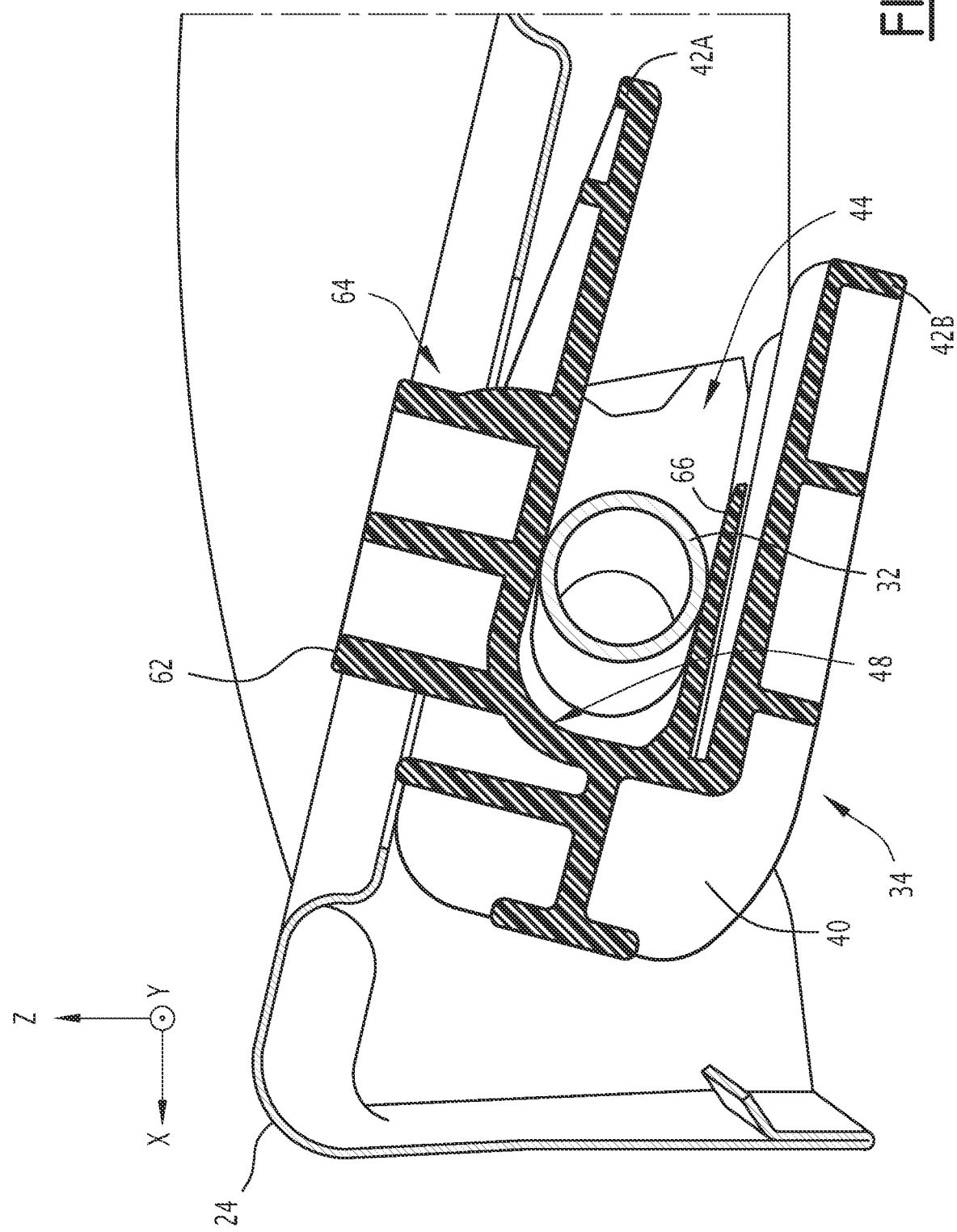
FIG. 4 is a sectional view along the axis IV-IV of the seat base of FIG. 2.

Each clip 34 further comprises a tongue 66 projecting from the baseplate 40 into the receiving space 44. As shown in FIG. 4, the tube 32 is received between the tongue 66 and one of the branches 42, here the upper branch 42A.

The tongue 66 prevents play between the tube 32 and the branches 42 and thus avoids the generation of undesirable vibrations and noise.

The baseplate 40, the two branches 42, each tie 50, and advantageously the fastening element 62 and the tongue 66, are integral; that is, together they form a single (one-piece) component.

In other words, each clip 34 is formed entirely of the same material in order to form a single block of material. In particular, as explained below, the clip 34 is obtained by injecting a single material into a single mold.

Advantageously, each clip 34 is formed of polyoxymethylene in copolymer form (usually designated by POM-C). Such a material has good mechanical strength while having significant elasticity, allowing the parts to be held together in the event of breakage during a rear crash.

A method of manufacturing this clip 34 will be described briefly below.

The method comprises an initial step of providing a single mold. It is thus not necessary to use several molds, which therefore allows for a simple and fast implementation.

Then, the method comprises a step of injecting a copolymer, in particular POM-C, into the mold in order to form the clip 34.

Then, the clip 34 is removed from the mold. The clip 34 is thus formed from a single block of material.

This manufacturing method therefore does not require the assembly of several parts together, which further simplifies the manufacture of such a clip 34.

In addition, each tie 50 requires little material and does not require a complex mold.

It is therefore conceivable that this clip 34 is inexpensive and easy to manufacture.

The seat base 14 makes it possible to prevent the ejection of parts into the passenger compartment of the vehicle during a rear crash due to each tie 50 being arranged between the baseplate 40 and one of the branches 42.

The invention claimed is:

1. A seat base of a vehicle seat, in particular a motor vehicle seat, comprising:
two seat base side flanges;
a seat base front flange rotatably mounted with respect to the two seat base side flanges; and
an adjustment mechanism for adjusting the orientation of the front flange relative to the seat base side flanges, the adjustment mechanism comprising:
two connecting rods, each connecting rod being connected to one of the seat base side flanges;
a tube extending between the two connecting rods; and
at least one clip fastened to the front flange, each clip comprising a baseplate and two branches extending from the baseplate to form a receiving space wherein a part of the tube is received, each clip further comprising at least one tie arranged between the baseplate and one of the branches, wherein the baseplate, the two branches, and each tie are integral.

2. The seat base according to claim 1, wherein each clip comprises two ties arranged on either side of the baseplate.

3. The seat base according to claim 1, wherein the two branches comprise an upper branch connected to the front flange and a lower branch extending opposite the upper branch, each tie being arranged between the baseplate and the lower branch.

4. The seat base according to claim 3, in which each tie comprises:
a first projection out of the baseplate;
a first segment extending from the first projection in a direction orthogonal to the lower branch;
a second projection out of the lower branch; and
a second segment extending from the first segment substantially in the same direction as the lower branch to the second projection.

5. The seat base according to claim 3, wherein each clip comprises a fastening element projecting from the upper branch, the fastening element being a quarter-turn fastener cooperating with an opening arranged in the front flange.

6. The seat base according to claim 1, wherein each clip is formed of polyoxymethylene in copolymer form.

7. The seat base according to claim 1, wherein each clip comprises an inner surface defining the receiving space for receiving the tube, the inner surface having a rounded shape at the connection between the baseplate and each branch.

8. The seat base according to claim 1, wherein each clip comprises a tongue projecting from the baseplate into the receiving space, the tube being received between the tongue and one of the branches.

9. The seat base according to claim 1, wherein the baseplate, branches and at least one tie together comprise a one-piece molded component formed in a single mold step.

10. A vehicle seat for a motor vehicle, comprising the seat base according to claim 1.

11. A method comprising at least the following steps:
providing a seat base according to claim 1, wherein each clip is manufactured by providing a single mold; and injecting a copolymer into the mold to form each clip, wherein the step of providing the seat base includes fastening each clip to the front flange of the seat base and receiving the tube in each clip.

* * * * *